July 3, 1962 M. C. STEELE 3,042,853
SEMICONDUCTOR ELECTRICAL APPARATUS
Filed June 24, 1957 4 Sheets-Sheet 1

INVENTOR.
Martin C. Steele
BY
ATTORNEY.

July 3, 1962  M. C. STEELE  3,042,853
SEMICONDUCTOR ELECTRICAL APPARATUS
Filed June 24, 1957  4 Sheets-Sheet 2

INVENTOR.
Martin C. Steele
BY
ATTORNEY.

July 3, 1962  M. C. STEELE  3,042,853
SEMICONDUCTOR ELECTRICAL APPARATUS
Filed June 24, 1957  4 Sheets-Sheet 3

INVENTOR.
Martin C. Steele
BY
ATTORNEY.

July 3, 1962 M. C. STEELE 3,042,853
SEMICONDUCTOR ELECTRICAL APPARATUS
Filed June 24, 1957 4 Sheets-Sheet 4

INVENTOR.
Martin C. Steele
BY
ATTORNEY.

3,042,853
SEMICONDUCTOR ELECTRICAL APPARATUS
Martin C. Steele, Princeton, N.J., assignor to Radio Corporation of America, a corporation of Delaware
Filed June 24, 1957, Ser. No. 667,597
12 Claims. (Cl. 323—94)

This application is a continuation-in-part of application Serial No. 649,482, filed March 29, 1957.

The present invention relates to devices and circuits which depend for their operation on the sudden change in resistivity of certain types of semiconductors under predetermined conditions of applied electric field and ambient temperature. This sudden change in resistivity, also known as "breakdown," manifests itself by a sharp change in the transfer function, that is, the output current to input voltage characteristic of the semiconductor.

At room temperature, metals have relatively low resistivities, whereas semiconductors have relatively high resistivities. At very low temperatures, certain metals, alloys and compounds become "superconductive," that is, their resistance reduces to zero ohms. Semiconductors do not become superconductive at low temperatures. To the contrary, at very low temperatures most semiconductors show a marked increase in resistivity. This is particularly true for extrinsic type semiconductors whose electrical properties depend upon the presence of impurity substances.

At low temperatures, the electric charge carriers present in certain types of semiconductors attain relatively high "mobilities." A relatively small electric field, of the order of a few volts per centimeter, can then impart enough energy to the electric charge carriers, i.e., electrons or holes present in excess, to cause "impact ionization" of the donor and acceptor impurities. "Mobility" (also known as $\mu$) is a parameter of a charge carrier which is defined as the ratio of the drift velocity ($V_d$) to the electric field (E) applied to the semiconductor ($\mu = V_d/E$). The term "impact ionization," as used here, refers to a phenomenon in which an atom has been struck by a charge carrier (a hole or an electron) moving under the stimulus of an electric field, and which has thereby lost an electron or hole and become an ion.

When impact ionization occurs, the resistivity of the semiconductor suddenly sharply decreases. This phenomenon may be termed the "breakdown" of the resistivity. The sudden decrease in the resistivity of the semiconductor causes a substantial increase in the flow of current through the semiconductor.

A general object of the present invention is to provide improved devices and circuits which use the above-described phenomenon to advantage.

Another object of the invention is to provide amplifiers and rectifiers of electrical signals which operate on a new principle.

Another object of the present invention is to provide improved amplifier and rectifier circuits which are capable of extremely high frequency operation.

Another object of this invention is to provide improved signal mixer and other circuits which include semiconductor devices operating in the breakdown or high mobility region.

Still another object of the present invention is to provide new and useful types of semiconductor devices.

Various embodiments of the invention include a material which exhibits a sharp change in resistivity due to impact ionization under predetermined conditions of temperature and applied field. The temperature and applied field are adjusted to values such that further change in applied field causes the sharp change in resistivity to occur. The applied field is then varied in accordance with a characteristic of an input signal to an extent sufficient to cause the sharp change in resistivity during at least a portion of the duration of the signal.

In one form of the invention, the material may be a semiconductive material such as germanium, silicon or others mentioned below. For such materials, temperatures of the order of liquid nitrogen and lower temperatures are required. Devices formed of these materials and operated at the low temperatures described may be referred to as "cryistors" by analogy with other semiconductor variable resistors such as thermistors and transistors. The applied field may be produced by a voltage applied to connections to the semiconductor and/or by immersing the semiconductor in an electric or electromagnetic field. These forms of the invention are especially useful as rectifiers. The input signal, in these cases, is normally applied to vary the field. The rectification base line or operating point may be controlled by the temperature.

In a preferred embodiment of the invention, a third means for signal control may be employed in addition to the two discussed above. The third means is one which generates a second field and applies it to the body. The second field may be magnetic, electrical or electromagnetic in nature.

In the first two cases, it has been found that the field influences the point at which impact ionization occurs. Thus, the voltage applied across the body may, if desired, be maintained constant and the ambient temperature may also be maintained constant. The input signal is then applied to control the strength of the second field, either magnetic or electric, in which the semiconductor is immersed. If the voltage and temperature are initially adjusted to values such that the resistivity of the body is sufficiently close to or within the breakdown region, relatively small changes in the field cause relatively large changes in the flow of current through the body.

Different forms of the above embodiment of the invention act as amplifiers or rectifiers, depending upon, in some cases, the direction of the field as compared to the direction of current flow through the body, and in other cases, upon the presence or absence of a predetermined value of biasing external field for initially maintaining the semiconductor within the breakdown region rather than outside of it.

As mentioned in the preceding paragraph, the third means for control may, rather than being an electric or magnetic field, consist of electromagnetic radiation such as infra-rad rays, ultra violet rays, X-rays, etc. These forms of the invention operate similarly to the ones described above, however, the breakdown mechanism is somewhat different. In the preceding forms of the invention, the electric field imparts sufficient energy to the charge carriers to cause impact ionization, as already described. However, when electromagnetic radiation such as infra-red rays are used, these give up their energy in the form of quanta directly to the semiconductor atoms and cause them to become ionized.

In addition to the forms of the invention already described, in which two or three means for controlling the semiconductor breakdown are employed, various combinations of the means for control may be employed. For example, both the magnetic and electric field may be applied simultaneously to thereby obtain four means for control. This form of the invention may be used for signal mixing or in computer circuits or in many other circuits in which there are several input signals and one output signal.

The invention will be described in greater detail by reference to the following description taken in connection with the accompanying drawing in which.

Similar reference characters are applied to similar elements throughout the drawings.

Figures 1, 2A, 2B, 3:
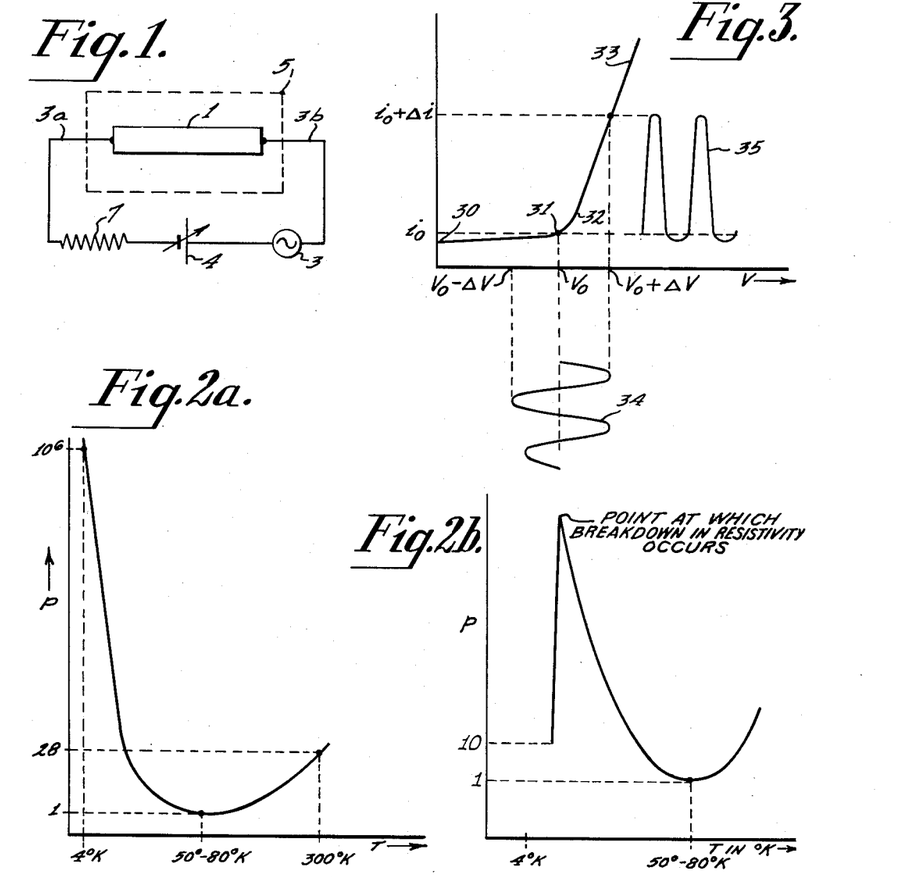
FIGURE 1 is a schematic diagram of one embodiment of the present invention.
FIGURES 2a and 2b are graphs showing the variation of resistivity with temperature for a semiconductive material such as germanium.
FIGURE 3 is a graph showing the circuit of FIGURE 1 operating as a rectifier.

Referring to FIGURE 1, the body of semiconductive material 1 is in series with a signal source 3, a direct voltage source 4, and a load, shown as resistor 7. The semiconductive material is one of the type which has a relatively steep resistivity vs. temperature characteristic and in which the resistivity sharply changes under certain conditions of applied voltage and ambient temperature. Crystalline semiconductive materials, such as N or P-type germanium, silicon alloys of germanium, and N or P-type silicon and P-type indium antimonide, are among the types of material which are suitable. The signal source 3 may consist of any means for producing a signal which it is desired to rectify. Direct voltage source 4 is preferably adjustable and is shown in the figure as a battery. The leads 3a and 3b may be connected to the semiconductor body by any of several well known techniques, such as soldering to vapor deposited metal coatings on the semiconductor body or to coatings formed of a cured silver paste.

Body 1 is located in a low temperature environment indicated schematically by the dashed box 5. The box may represent a liquid helium cryostat or other means for maintaining body 1 at a low temperature. Liquid helium liquefiers are commercially available as are double Dewar flasks which use liquid nitrogen in the outer Dewar and liquid helium in the inner Dewar, and lose less than 1% of their liquid helium per day. Where a material such as germanium is used as the semiconductor, an upper temperature limit of 25–32° Kelvin (K.) is feasible, although lower temperatures may be employed. For a semiconductive material such as silicon an upper temperature limit, which is approximately that of liquid nitrogen such as 80° K., may be used. However, liquid hydrogen or liquid helium temperatures are generally preferred. It is believed to be unnecessary to discuss in detail the means for maintaining the semiconductive material at low temperatures. These are described, in general, in the article entitled, "Low Temperature Electronics," in the Proceedings of the IRE, volume 42, pages 408, 412, February 1954 and in other publications.

The graph of FIGURE 2a shows, in brief, how the resistivity of a body of semiconductive material such as a particular sample of germanium varies with temperature in the presence of electric fields less than that required to produce "breakdown." Absolute temperature T is plotted as the abcissa and the logarithm of the resistivity $\rho$ is plotted as the ordinate. At room temperature, this sample of germanium has a resistivity of approximately 28 ohm-centimeters. The resistivity reaches a minimum value at a temperature of about 50 to 80° K. and then rises rapidly to approximately $10^6$ ohm-centimeters at about 4° K. Note that at very low temperatures only a relatively small increment in temperature is required rapidly to change the resistivity.

FIGURE 2b is a graph showing how the resistivity of the same sample of semiconductive material shown in FIGURE 2a varies with temperature when an electric field—say one produced by applying 10 volts to terminals 3a and 3b of the embodiment of FIGURE 1 is applied to the sample after its temperature has been lowered to a value at which breakdown can occur. Down to a temperature of about 20° K. the curve is exactly the same as the one shown in FIGURE 2. However, when the temperature is reduced further, and, thereafter, the electric field is applied, the charge carriers attain such high mobilities from the electric field that they cause impact ionization of the donors or acceptors. When this occurs, the high value of resistivity, which may be on the order of $10^6$ ohm-centimeters (the exact value depending on the temperature of the sample prior to breakdown) changes extremely sharply to a very low value of resistivity on the order of 10 ohm-centimeters.

Another curve demonstrating this phenomenon is shown in FIGURE 3. Assume the material to be germanium and the temperature to be on the order of 10° K. or so. During the portion 30, 31 of the curve, the resistivity of the semiconductive material is extremely high. A relatively large change of input voltage applied to the semiconductor body 1 of FIGURE 1, under these conditions, causes practically no change in the output current $i_0$ of the body. However, when one goes from point 31 to point 32 on the curve, the resistivity of the body has begun sharply to change and this manifests itself as a sharp change in output current $i_0$. The remainder of the curve 32, 33 is extremely steep, even more so than illustrated in the figure.

In the operation of the embodiment shown in FIGURE 1, the temperature of the semiconductor 1 is initially adjusted to a point such that the semiconductor exhibits high resistivity. The bias voltage source 4 is then adjusted to a point such that the semiconductor is nearly at the breakdown point. If now an input signal is applied by source 3, it will periodically drive the semiconductor into the region of low resistivity, manifesting itself as high output current or high voltage across load 7. FIGURE 3 shows the input signal as a sine wave 34 and the output signal as a half rectified wave 35.

The circuit of FIGURE 1 is especially useful at high frequencies. The charge carriers are majority charge carriers. For example, in the case of N-type germanium, the charge carriers are electrons. The operating frequency of the device is therefore not limited by carrier lifetime or by the carrier drift velocity, as in the case of drift transistors, for example. Another advantage of the circuit of FIGURE 1 is that the input capacitance to the semiconductor body 1 is relatively low. For this additional reason it is especially useful at high frequencies.

In a practical circuit according to the embodiment of FIGURE 1, the semiconductor material employed was N-type germanium. The body was about 6 millimeters in length and had a cross sectional area of about 1 square millimeter. The body was maintained at a temperature of about 4.2° K. by immersing the same in liquid helium. Source 3 consisted of a signal generator and its output was varied from about 100 cycles per second to about 50 megacycles per second. The battery was maintained at a voltage of about 10 volts and the output of the circuit measured by a direct current microammeter in series with body 1.

Figure 4:
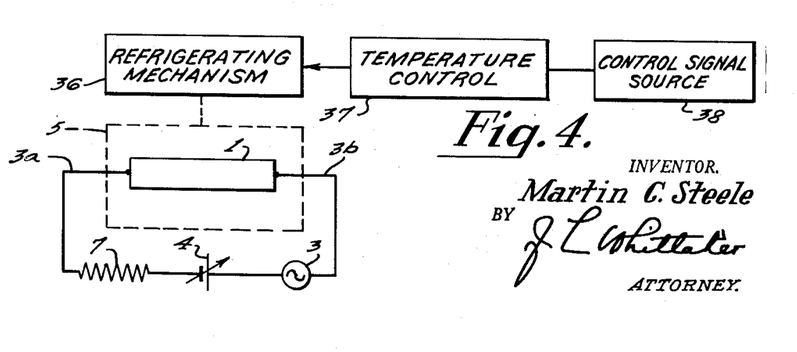
FIGURE 4 is a block and schematic circuit diagram of another embodiment of the invention.

FIGURE 4 shows a circuit with two means for signal control. The first has already been described in connection with FIGURE 1 and consists of varying the voltage across the semiconductor, thereby varying the electric field in the semiconductor. The second consists of varying the semiconductor temperature. A means for doing this is shown schematically and includes the refrigerating mechanism 36, the temperature control means 37 for the refrigerating mechanism and the control signal source 38. The last circuit mentioned produces a direct or alternating voltage which controls the temperature of the semiconductor via the temperature control and refrigerating mechanism.

As specific examples of the controls shown in block form in FIGURE 4, control signal source 38 may be any source of signal. The refrigerating mechanism 36 may include a vacuum pump which pumps helium vapor above the liquid helium. The vapor pressure of the helium vapor then determines the temperature within dashed block 5. Temperature control 37 may include a means responsive to the signal from source 38 for controlling the helium vapor pressure.

As a practical matter, if a sine wave input is employed to control the semiconductor temperature of the arrangement of FIGURE 4, the frequency of the sine wave must be low, on the order of 10 cycles per second at the present state of the art, in view of the relatively long time constant of the temperature control circuit. Ordinarily, the control signal is a direct voltage, and its function is to control the operating point of the semiconductor. In other words, it controls the base line of rectification, the input alternating current it is desired to rectify being provided by source 3.

Figure 6:
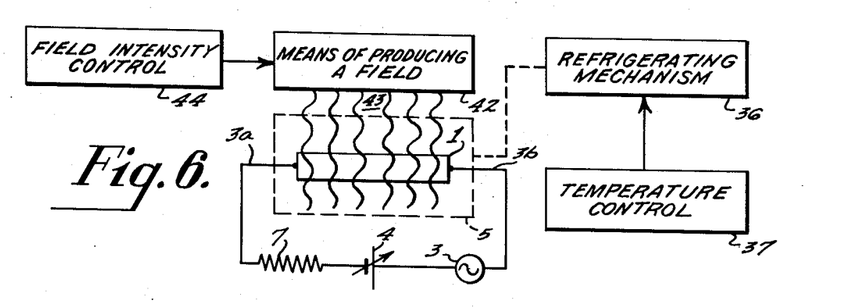

The embodiment shown in FIGURE 6 includes, in addition to the two means for control already described, a third control mechanism. It is the means 42 for producing a field 43, shown by the wavy lines passing through the semiconductor 1. The field intensity is controlled by a circuit illustrated as a single block 44. Details of circuit 44 are given later. As already mentioned, the field 43 may be electric, magnetic, or electromagnetic in nature. The direction of the field as compared to the direction of current flow is one of the factors which determine the mode of operation of the circuit. The illustration of FIGURE 6 is meant to be general in this respect. Another factor which influences circuit operation is the strength of field 43.

Figure 7:
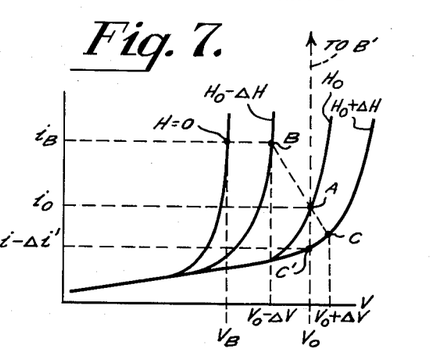
FIGURE 7 is a graph showing the variation in current with applied voltage for different conditions of applied magnetic field in the embodiment of FIGURE 6.

FIGURE 7 illustrates the manner in which the circuit of FIGURE 6 operates, assuming the field to be a magnetic field. The illustration would be similar for cases in which the field was electric or electromagnetic. FIGURE 7 is explained later, in connection with the embodiment of FIGURE 8.

Figure 8:
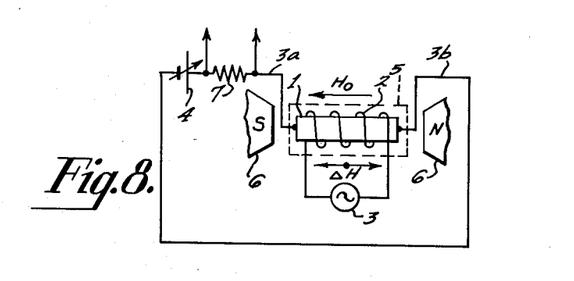
FIGURE 8 is a diagram of a form of the invention in which the control means is a magnetic field.

The embodiment shown in FIGURE 8 is a magnetic field controlled form of the invention. The semiconductor is immersed in a biasing magnetic field produced by a magnet 6 which may be a permanent magnet or an electromagnet. In addition, a coil 2 is wound around the semiconductor and the magnetic field produced by the coil varied in accordance with the input signal from source 3. The magnetic field produced by the biasing magnet 6 is indicated schematically by the arrow $H_o$ and may be termed a biasing magnetic field, and the magnetic field produced by the coil 2 is indicated schematically by the double-headed arrow $\Delta H$ and may be termed a control magnetic field. In this embodiment, the two magnetic fields are co-linear.

In operation, the value of the biasing magnetic field, the voltage applied by battery 4, and the temperature of the semiconductor are initially adjusted to values such that the semiconductor is either in the breakdown region or close to the breakdown region. If one considers FIGURE 7, the voltage may initially be adjusted to a value $V_o$ and the magnetic field to a value $H_o$. The temperature is also adjusted so that the operating point is A on curve $H_o$. The output current at this point is $i_o$. The curves are shown in somewhat exaggerated form and point A can be considered to be a partial breakdown point, that is, a point at which the resistivity of the semiconductor is about to undergo a very sharp change in resisitivity with a slight increase in applied voltage or a slight decrease in applied magnetic field. If now the voltage $V_o$ across the semiconductor remains constant, and the magnetic field is increased an amount $+\Delta H$ (by changing the current through coil 2), the operating point of the semiconductor shifts from point A to point C' and the current from $i_o$ to $i_o - \Delta i'$. By the same token, if $V_o$ is maintained constant and the magnetic field decreased an amount $-\Delta H$, the operating point shifts from A to B' (which is off the graph), and the output current shifts to some extremely high value (which is also off the graph). As a practical matter, however, when the resistivity of the semiconductor changes, the voltage across it changes due to the fact that there are other resistances in series with the semiconductor. Accordingly, in operation, when the magnetic field changes from $H_o$ to $H_o + \Delta H$, the resistivity of the semiconductor increases, and the voltage across the semiconductor increases to a new value $V_o + \Delta V$. When the magnetic field is decreased an amount $-\Delta H$, the voltage across the semiconductor changes to a new value $V_o - \Delta V$. The operating point then of the semiconductor varies along the dashed line BAC and the output current changes accordingly.

With the semiconductor device biased in the manner illustrated in FIGURE 7, an input signal applied to change the magnetic field will, in effect, produce an amplified and rectified output signal. The device operates somewhat like a class C amplifier. However, the initial conditions can be changed to make the operating point A such that the device amplifies an input signal with less distortion and acts more like a class A amplifier.

In the mode of operation described above, as applied to FIGURE 4, it is assumed that the output of generator 3 is zero volts and that the temperature T remains constant. However, in some forms of the invention, one or both may be varied at the same time that the field (magnetic or other external field) is varied.

The circuit described above is highly useful as a power amplifier. This can be understood from a consideration of FIGURE 7 and the input and output powers of the circuit. For example, one may assume that body 1 is initially operating in the breakdown mode, say at point B on curve $H_o - \Delta H$. The power output of the device then is $i_B \times V_B$, where $i_B$ is a relatively high value of current. If now the magnetic field is changed a relatively small amount by expending a small amount of power in the coil so that the device is no longer operating in the breakdown mode, the power output of the device is decreased enormously. In other words, a small change in input power causes a relatively large change in output power.

It is not essential, although considered highly desirable, for the coil 2 to be formed of a material which becomes superconducting at the temperature at which body 1 exhibits its sharp change of resistivity. The wire, for example, may be constructed of a material such as niobium or lead. When superconducting, the power dissipation losses for the coil are negligible for direct current operation.

In the embodiment of FIGURE 8 and in the other embodiments discussed herein, the resistor 7 is shown of fixed value. The value of resistance, in effect determines the operating line BAC of FIGURE 7. If the value of resistor 7 is much higher than that of body 1, the change in voltage across the body due to its breakdown in resistivity will be relatively small and line BAC will be closer to the vertical (see C', A, B' in FIGURE 7). If, on the other hand, the value of resistance 7 is closer to that of the body 1 when the latter is in the breakdown condition, the change in voltage across the body due to its breakdown in resistivity will be relatively large, and operating line BAC will be almost parallel to the V axis of FIGURE 7.

The above interesting phenomenon also provides an additional means for the control of the breakdown phenomenon. Resistor 7 may be made variable and adjustment of its value made a parameter for controlling the point at which breakdown occurs.

Figure 17:
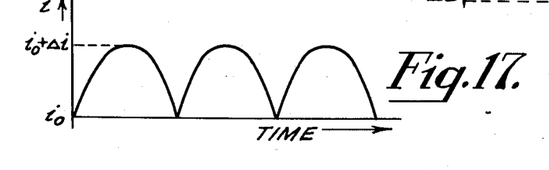

In the embodiment of FIGURE 8, the control and biasing magnetic fields are applied co-linearly with the applied electric field. Other forms of the invention are possible. For example, the biasing magnetic field may be applied co-linearly with the applied electric field and the control magnetic field at right angles with the biasing magnetic field. It can be shown that if the semiconductor is initially in the breakdown region, the control magnetic field may be adjusted periodically to drive the semiconductor into its high resistivity condition. Thus, if the control magnetic field is sinusoidally varied by applying a sine wave signal from source 3, the output wave will be a rectified wave. It can be shown that the wave will look like an inverted version of the wave of FIGURE 17. In some forms of the invention the biasing magnetic field may be omitted entirely. If it is and the circuit is initially adjusted so that the semiconductor is in the breakdown region, the application of a control magnetic field which is co-linear with the applied electric field may periodically drive the semiconductor to its high resistivity condition. Here, too, the output wave will be a rectified wave of the type described above, if the input wave is a sine wave of sufficient amplitude periodically to drive the semiconductor to its high resistivity condition.

Figure 9:
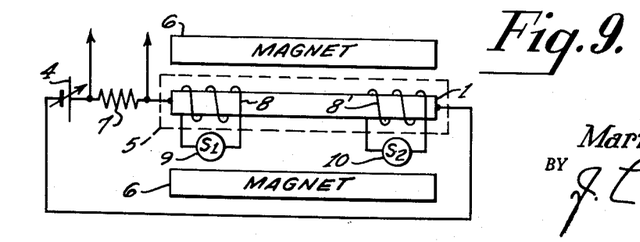
FIGURE 9 is a diagram of an embodiment of the invention in which two control magnetic fields are used.

In the device illustrated in FIGURE 9 the semiconductor body 1 is shown disposed in a cryostat 5 with two coils 8 and 8' disposed thereabout. These coils are each selectively energizable by signal sources 9 and 10. A biasing magnetic field is established by permanent magnet 6. In operation of this device, a biasing electric field close to the point of breakdown is established by adjustment of variable voltage means 4, and coils 8 and 8' are energized by input signal sources 9 and 10. The output is derived across impedance 7. The value of impedance 7 is substantially less than that of the impedance of the semiconductor body in its breakdown state. Hence, it is the resistance of the semiconductor body that essentially determines the current flow through the circuit. By operation of this device in a desired manner, it will be seen that the output signal obtained may be a mixed, modulated or demodulated signal depending upon the relationship of the input signal sources.

Figure 10:
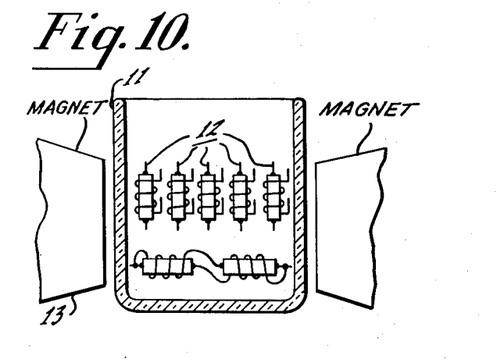
FIGURE 10 is an elevational view, partly in section, of a plurality of semiconductor devices according to the invention maintained in a common biasing magnetic field.

Although the biasing magnetic fields have been shown in FIGURES 8 and 9 as distinct fields associated with each semiconductor body, a single biasing magnetic field may be used in which a plurality of the cryistor devices are immersed. This is illustrated in FIGURE 10. A Dewar flask 11 maintains the desired low temperature in which the cryistors 12 are placed. As may be noted, each of these cryistor devices is essentially a four terminal element consisting of two connections to the semiconductor body for the flow of current therethrough and two connections to the coil for establishing the control magnetic fields. The biasing magnetic field may be established by a permanent magnet 13, as illustrated, or by a solenoid, as desired, in a direction such that a substantial portion of its field is co-linear with that established by the individual coils. Although the magnet 13 has been shown as outside of the Dewar flask, it may equally well be immersed therein. In the lower half of the flask is shown two cryistors connected in flip-flop circuit arrangement. Such devices may form part of a computer circuit, and many such devices may be conveniently arranged in typical computer circuitry in a very small volume.

Figure 11:
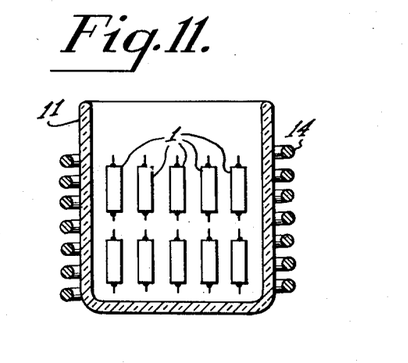
FIGURE 11 is an elevational view, partly in section, of a plurality of semiconductor bodies influenced by a common control magnetic field.

FIGURE 11 shows an embodiment of this invention in which a single control magnetic field is simultaneously applied to a plurality of semiconductor bodies 1. These bodies are contained in a Dewar flask 11 which serves as a cryostat therefor, maintaining the desired low temperature. Inasmuch as a common control magnetic field is applied, there are no individual control coils wound about the semiconductor bodies and therefore only two leads are associated with each semiconductor body. These bodies are operated in the manner hereinbefore described, namely, at the semiconductor breakdown point. The control magnetic field is shown as provided by a solenoid 14, although any similar arrangement providing a selectively variable control magnetic field may equally well be used. If the solenoid providing the control field is located outside of the cryostat, as shown, the windings thereof may be of copper or other suitable conductor. Where the solenoid providing the control field is located within the cryostat, a material that is superconducting at the temperature employed is preferred inasmuch as no power will then be required to sustain the magnetic field. Although not shown, a biasing co-linear magnetic field is preferably present. The devices illustrated are particularly suitable where it is desired to have a plurality of switching operations occurring simultaneously. Thus, many of the semiconductor bodies may very conveniently be located within a small volume, these bodies being driven into a breakdown state simultaneously by application of a single control magnetic field.

Figure 12:
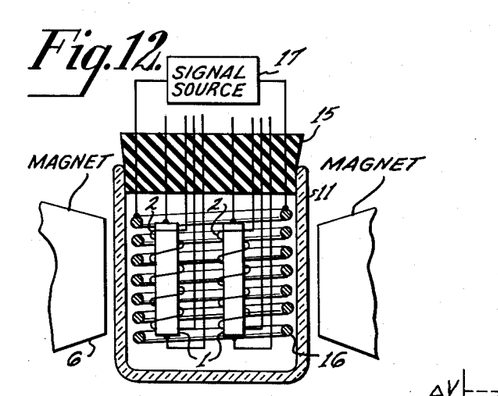
FIGURE 12 is an elevational view, partly in section, of a plurality of semiconductors in which the biasing magnetic field used is variably controlled.

FIGURE 12 illustrates an embodiment of this invention which is particularly suitable for multiple mixing and modulation operations. The semiconductor bodies 1 are shown with individual control magnetic fields obtained by coils 2 wound thereabout. It is preferred that the coils 2 be made of a conductive material that is superconducting at the temperatures employed. The semiconductor devices are immersed in a cryostat such as a Dewar flask 11 containing a suitable low-temperature environment. The leads from the semiconductor body and from the control coils are passed through seal 15 and connected to desired circuitry, not shown. In this embodiment of the invention, substantially co-linear biasing magnetic field is shown as provided by two sources, one giving a fixed biasing magnetic field, such as magnet 6, the other giving a variable one, such as solenoid 16. Signal source 17 is used to control the operating of this variable magnetic field. By pulsing of this magnetic field either synchronously or in opposition to the control magnetic field, or in some other desired manner, each in response to a given signal source, various output signals may be obtained of a mixed or modulated nature.

Figure 13:
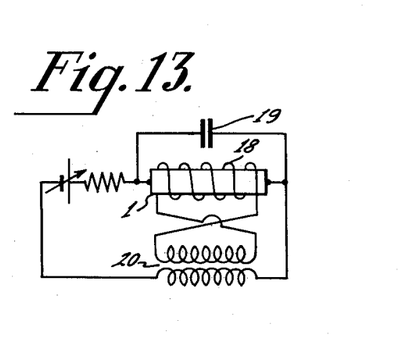
FIGURE 13 is a schematic representation of a form of the invention used as a relaxation oscillator.

The cryistor of this invention also finds usefulness as a relaxation oscillator, as illustrated in FIGURE 13. An oscillatory circuit consisting of an inductor 18 and a capacitor 19 sustains oscillation in the semiconductor body 1 by driving it alternately from a breakdown to an ohmic condition. Transformer arrangement 20 is used to invert the direction of the magnetic field in order to provide an opposing field which will sustain oscillation rather than become degenerate. It will be readily apparent that oscillation may also be sustained by providing a properly oriented co-linear biasing magnetic field in suitable opposition to the control magnetic field.

For purposes of illustration, as an example of a typical operation of the circuit illustrated in FIGURE 8, one may assume a square wave of equal on and off periods of frequency $f$ as the input signal source 3 to the device shown. Voltage biasing means 4 may be adjusted to provide a voltage of 10 volts. Impedance 7 has a value of 10 ohms, and the semiconductor body may have resistance of 400 ohms at breakdown. This breakdown value corresponds to an N-type germanium crystal having dimensions of 0.1 x 0.1 x 1 cm. For an inductance $L=4\mu H$, corresponding to a single layer coil of 40 turns of 5-mil diameter wire over a length of 1 cm. and a $\Delta H$ value of 20 gauss, a power gain of 50 is obtained, for the given power output of 2.5 milliwatts. Inasmuch as no semiconductor body becomes superconducting no matter how low a temperature is used, even at the breakdown state of the semiconductor a resistance of 400 ohms may be conveniently obtained. Thus, a cryistor device is particularly convenient in matching the impedance of other circuit elements and in computing time constants.

Although not essential in the operation of the device above, it is preferable that coil 2 be formed of a material which is superconducting at low temperatures and which is in the low temperature region. However, if the coil is located outside the low temperature region, any conventional conductive material such as copper or the like may be used. Because semiconductor bodies may be made in extremely small sizes, as is well known in this art, cryistor devices are particularly useful in computer circuitry where many such devices may be included within a relatively limited volume.

Figure 14:
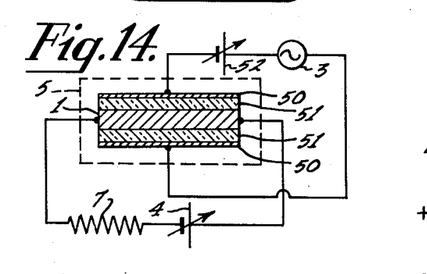
FIGURE 14 is a schematic showing of an electric field control embodiment of the invention.

FIGURE 14 shows an electric field controlled embodiment of the invention. Elements 1, 7 and 4 are analogous to the like numbered elements of the embodiments already described. The value of bias voltage produced by source 4 produces an electric field $E_o$ through the semiconductor. A pair of plates 50 analogous to condenser plates are spaced from the semiconductor by dielectric material 51. The input signal produced by source 3 varies the voltage across the plates and thereby varies the field between the plates. The direction of the field produced by the condenser plates is at right angles to the field produced by battery 4. Battery 52 produces a quiescent transverse electric field and may be ignored for the present.

Figure 15:
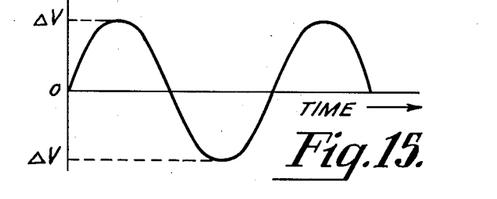
FIGURES 15–17 are diagrams to explain the operation of the circuit of FIGURE 14.
Figure 16:
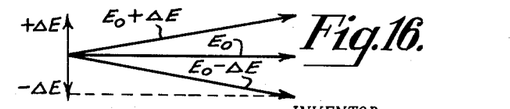

In operation, assume that the output of battery 52 is initially zero volts. Assume also that the signal applied by source 3 is sinusoidal in nature and varies from $-\Delta V$ to $+\Delta V$. The time variation of the signal is shown in FIGURE 15. A vector diagram of the fields produced by the bias voltage $V_o$, which produces a field $E_o$, and the input voltage, shown in 15, which produces a field which varies from $-\Delta E$ to $+\Delta E$, is shown in FIGURE 16. As can be seen, the field $\pm \Delta E$ is at right angles to the field $E_o$. When the vectors are added, the resultant vectors $E_o+\Delta E$ and $E_o-\Delta E$ are obtained. It can be seen that these vectors are of the same magnitude, even though the input wave varies from plus to minus. Accordingly, the device shown in FIGURE 14 acts as a full wave rectifier and produces the output shown in FIGURE 17. With appropriately chosen parameters both voltage gain and power gain may be obtained. The semiconductive material may be one of the types mentioned previously. It may, for example, be N or P-type germanium, P-type indium antimonide, N and P-type silicon, germanium-silicon alloys.

The source 52 is useful for adjusting the rectification operating point and shape of the resulting wave form. It is analogous to the magnets 6 of the magnetic embodiments which produce a biasing magnetic field.

Figure 18:
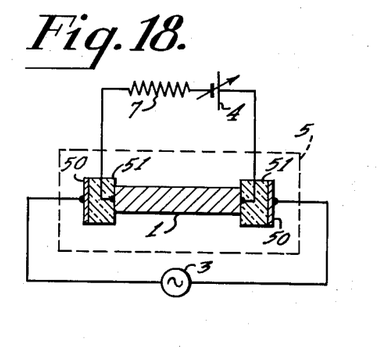
FIGURE 18 is another embodiment of an electric field control semiconductor circuit according to the invention.
Figure 19:
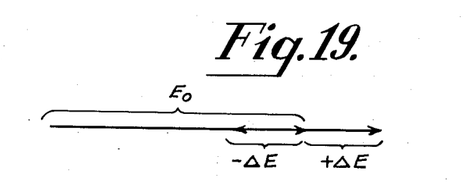
FIGURE 19 is a vector diagram to explain FIGURE 18.

The embodiment of FIGURE 18 is similar to the one of FIGURE 14 except that the external electric field produced by condenser plates 50 is applied to the semiconductor in the same direction as the biasing voltage produced by battery 4. The vector diagram illustrating the operation of this embodiment is shown in FIGURE 19. It is clear from FIGURE 19 that an input wave at 7 which varies from plus to minus will cause an output wave at load 7 which also varies from plus to minus. Accordingly, an input sine wave signal, for example, may be faithfully reproduced at load 7 in amplified form. In this embodiment and in the one of FIGURE 14, the parameters temperature and applied bias voltage are initially adjusted to place the semiconductor either within the breakdown region or close to the breakdown region. The manner of operation is quite analogous to that of the magnetic embodiments.

Figure 20:
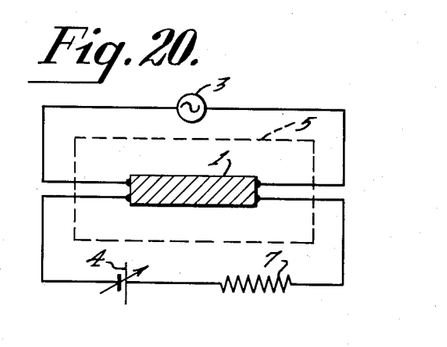
FIGURES 20 and 21 are schematic drawings of other embodiments of the invention.
Figure 21:
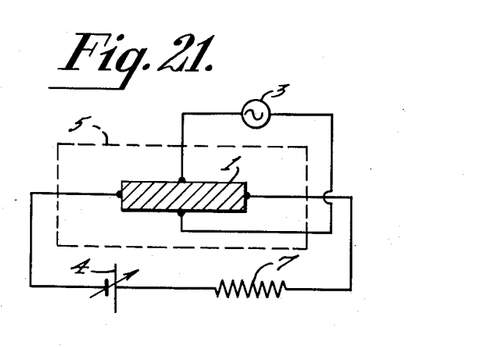

FIGURES 20 and 21 illustrate embodiments of the invention which are analogous to the embodiments of FIGURES 18 and 14, respectively. The only difference is that instead of applying the signal to the semiconductor body via condenser plates, it is applied instead via point contacts.

In the embodiments of FIGURES 18 and 20, the source 4 may be omitted provided the field generated by source 3 is sufficiently strong to cause impact ionization.

Although not illustrated, it is to be understood that the embodiments of FIGURES 14, 18, 20 and 21 may be used in arrangements analogous to the magnetic arrangements of FIGURES 9 through 13. In each case, the magnetic field is replaced with an electric field. The electric field may be generated, for example, by condenser plates of sufficient size to produce a field through the required number of semiconductors.

Figure 5:
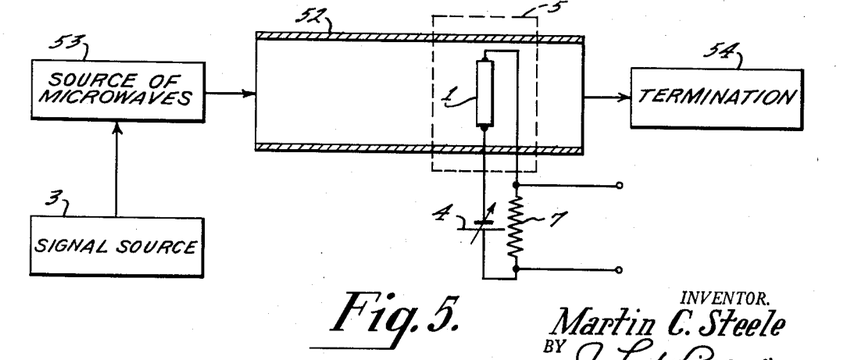
FIGURES 5 and 6 are block and schematic circuit diagrams of other forms of the invention.

FIGURE 5 illustrates an embodiment of the invention in which the means for control comprises an electromagnetic field. The semiconductor body is located within a length of waveguide 52. A source of microwaves 53 such as a magnetron or other high frequency oscillator is coupled to one end of the waveguide and the other end is terminated, preferably in its characteristic impedance, by a termination shown schematically at 54. The coupling structures are shown schematically by a single line. The source of microwaves may be amplitude modulated by a signal from the input source 3.

The circuit of FIGURE 5 operates similarly to the ones already described. The temperature and electric field applied to the semiconductor are initially adjusted so that the semiconductor is either within or almost within the breakdown region. The electromagnetic waves passing down the waveguide then influence the breakdown point similarly to the magnetic field of the embodiments of FIGURE 8, for example, or the externally applied electric field of the embodiment of FIGURE 14, for example.

With sufficient amount of power supplied by source 53, the direct voltage source 4 may be omitted. In this case, the electromagnetic waves themselves drive the semiconductor into the breakdown region by giving up part of their energy, in the form of quanta, directly to the semiconductor atoms causing them to become ionized.

It is to be understood that although the devices and the circuits described herein have been shown in connection with a number of specific embodiments, these are meant merely to be illustrative and not limiting. The principles enunciated herein are widely applicable to many different circuits. For example, they may be used in magnetometers and magnetic memory storage circuits to determine the magnetic state of magnetic material without disturbing the material. They may be used as current, voltage and power amplifiers. They may be used as a means of reading magnetically or electrostatically recorded material by running the record medium in front of the semiconductor so that changes in the magnetic or electric field sensed by the semiconductor cause current changes in the semiconductor. Finally, they are useful for video or audio switching as well as for various types of multiplexing and signal sampling devices.

Although not illustrated, it is to be understood that combinations of the various means for external field control may be used. Thus, the electric field embodiment of FIGURE 14 or 18 may be used with a magnetic field embodiment of FIGURE 8. In an embodiment of this type, one input signal may be used to change the magnetic field and another to change the electric field. Moreover, the direction of the field through the semiconductor may be changed to directions other than those illustrated. Thus, although only fields which extend at 90° or 0° or 180° to the direction of current flow through the semiconductor as shown, other angles may be used for different purposes.

What is claimed is:

1. In combination, a body formed of a material which exhibits a sharp change in resistivity due to impact ionization under predetermined conditions of temperature and applied electric field; means for maintaining said body at a temperature at which impact ionization can occur; means for applying a biasing electric field to the body of a value such that further change in applied electric field in a given sense will result in said sharp change in resistivity; and means for applying an alternating electrical signal to said body for varying the electric field applied to said body in accordance with the variations in amplitude of said signal for producing sharp changes in said resistivity.

2. In combination, a body formed of a semiconductive material which exhibits a sharp change in resistivity due to impact ionization under predetermined conditions of temperature and applied voltage, the latter influencing the electric field through said body, and in which the point at which the sharp change in resistivity occurs may be influenced by an externally applied field; means for adjusting the temperature of said body and said applied voltage to values such that further change in applied voltage can result in said sharp change in resistivity; means external of said body for applying a second field thereto; and means for varying one of said applied voltage and second field in accordance with a parameter of an input signal to an extent sufficient to cause said sharp change in resistivity during at least a portion of the duration of said signal, said means external of said body for applying a second field thereto comprising means for producing an electric field.

3. In combination, a body of semiconductive material of the type exhibiting a breakdown in resistivity due to impact ionization under predetermined conditions of temperature and applied electric field and in which the breakdown point may be influenced by an applied second field, said device including at least a pair of input terminals to which a voltage may be applied for controlling the electric field through said device; means coupled to said terminals for applying a direct voltage thereto having a value sufficient to cause said breakdown at a given low temperature; means for maintaining said device at said given temperature; and means for applying said second electric field to said body which varies in amplitude in accordance with the variations in amplitude of an alternating electrical signal to an extent sufficient to produce sharp changes in resistivity of the body.

4. In combination, a semiconductor device of the type exhibiting a sharp decrease in resistivity due to impact ionization at predetermined values of the parameters applied voltage and temperature, said device including at least a pair of input terminals to which a control voltage may be applied; a load coupled to said terminals; means coupled to said terminals for applying a control voltage thereto; means for controlling the temperature of said device; means for adjusting said two parameters to values such that said device is at least in the vicinity of the region in which it exhibits said sharp decrease in resistivity; another terminal on said device; and means for applying a signal voltage to said other terminal having an amplitude sufficient to cause said semiconductor device to exhibit said sharp change in resistivity during at least a portion of the duration of said signal.

5. In combination, a semiconductor device of the type exhibiting a breakdown in resistivity due to impact ionization at predetermined values of applied electric field and low temperature, said device including at least two pairs of input terminals to which voltages may be applied for controlling the electric field through said device; means coupled to one pair of said terminals for applying a direct voltage thereto having a value almost sufficient to cause said breakdown at a given low temperature; means for maintaining said device at said given temperature; and means coupled to the other pair of said terminals for applying a signal voltage thereto.

6. In combination, a semiconductor device of the type exhibiting a sharp decrease in resistivity due to impact ionization under predetermined values of applied voltage and temperature, said device including a pair of input terminals to which a control voltage may be applied; means coupled to said terminals for applying a control voltage thereto; means for controlling the temperature of said device; means for adjusting said temperature and control voltage to values such that said device is at least in the vicinity of the region in which it exhibits said sharp decrease in resistivity; and means for applying an electric field to said device which varies in accordance with a characteristic of a signal and which has a value sufficient to cause said semiconductor device to exhibit said sharp change in resistivity during at least a portion of the duration of said signal.

7. In combination, a substance the resistivity of which varies inversely with temperature in a temperature region between 50° and 0° Kelvin and which exhibits a breakdown in resistivity due to impact ionization when an electric field of a given value is applied to said substance at a predetermined temperature within said range; means for adjusting said temperature to a value at least close to said predetermined temperature; means for applying a biasing electric field to said substance which is close to said value; and means for applying an electric field to said substance which varies in accordance with a parameter of an input signal to an extent sufficient to produce said breakdown in resistivity.

8. In combination, a seminconductor, the resistivity of which varies inversely with temperature in a temperature range between 50° and 0° Kelvin and which exhibits impact ionization manifesting itself as a sharp decrease in resistivity when an electric field of given value is applied to said semiconductor at a predetermined temperature within said range; means for adjusting said temperature to a value equal to or less than said predetermined temperature; means for applying a biasing electric field to said semiconductor which is close to said given value; and means for applying an electric field to said semiconductor at substantially right angles to said biasing electric field which varies in accordance with a parameter of an input signal to an extent sufficient to produce impact ionization.

9. In combination, a semiconductor device of the type exhibiting a sharp decrease in resistivity due to impact ionization under predetermined values of applied voltage and temperature, said device including a pair of input terminals to which a control voltage may be applied; means coupled to said terminals for applying a control voltage thereto; means for controlling the temperature of said device; means for adjusting said temperature and control voltage to values such that said device is at least in the vicinity of the region in which it exhibits said sharp decrease in resistivity; and means, including a pair of conductive plates, one on each side of said device, for applying an electric field to said device which varies in accordance with a characteristic of a signal and which has a value sufficient to cause said semiconductor device to exhibit said sharp change in resistivity during at least a portion of the duration of said signal.

10. In combination, a semiconductor device of the type exhibiting a sharp decrease in resistivity due to impact ionization under predetermined values of applied voltage and temperature, said device including a pair of input terminals to which a control voltage may be applied;

means coupled to said terminals for applying a control voltage thereto; means for controlling the temperature of said device; means for adjusting said temperature and control voltage to values such that said device is at least in the vicinity of the region in which it exhibits said sharp decrease in resistivity; means, including a pair of conductive plates, one on each side of said device, for applying an electric field to said device, said plates being positioned relative to said device so that the field the plates produce is co-linear with the field produced by said control voltage; and means including a signal source coupled to said plates for varying the field produced by the plates, in accordance with a characteristic of a signal, to an extent sufficient to cause said semiconductor device to exhibit said sharp change in resistivity during at least a portion of the duration of said signal.

11. In combination, a semiconductor device of the type exhibiting a sharp decrease in resistivity due to impact ionization under predetermined values of applied voltage and temperature, said device including a pair of input terminals to which a control voltage may be applied; means coupled to said terminals for applying a control voltage thereto; means for controlling the temperature of said device; means for adjusting said temperature and control voltage to values such that said device is at least in the vicinity of the region in which it exhibits said sharp decrease in resistivity; and means, including a pair of conductive plates, one on each side of said device, for applying an electric field to said device which varies in accordance with a characteristic of a signal and which has a value sufficient to cause said semiconductor device to exhibit said sharp change in resistivity during at least a portion of the duration of said signal, said plates being positioned relative to said device that the field produced by said plates is at an angle to the field produced by said control voltage.

12. In combination, a semiconductor device of the type exhibiting a sharp decrease in resistivity due to impact ionization under predetermined values of applied voltage and temperature, said device including a pair of input terminals to which a control voltage may be applied; means coupled to said terminals for applying a control voltage thereto; means for controlling the temperature of said device; means for adjusting said temperature and control voltage to values such that said device is at least in the vicinity of the region in which it exhibits said sharp decrease in resistivity; and means, including a pair of conductive plates, one on each side of said device, for applying an electric field to said device which varies in accordance with a characteristic of a signal and which has a value sufficient to cause said semiconductor device to exhibit said sharp change in resistivity during at least a portion of the duration of said signal, said plates being so positioned relative to said device that the electric field applied by the plates is perpendicular to the electric field produced by said control voltage.

References Cited in the file of this patent

UNITED STATES PATENTS

| | | |
|---|---|---|
| 2,649,569 | Pearson | Aug. 18, 1953 |
| 2,666,884 | Ericsson et al. | Jan. 19, 1954 |
| 2,725,474 | Ericsson et al. | Nov. 29, 1955 |
| 2,736,858 | Welker | Feb. 28, 1956 |
| 2,743,322 | Pierce et al. | Apr. 24, 1956 |
| 2,752,434 | Dunlap | June 26, 1956 |
| 2,752,553 | Dunlap | June 26, 1956 |
| 2,832,897 | Buck | Apr. 29, 1958 |
| 2,891,160 | Leblond | June 16, 1959 |

OTHER REFERENCES

"The Cryotron, A Superconductive Computer Component," by Buck; pages 482–492 of PIRE for April 1956.